Patented Dec. 12, 1922.

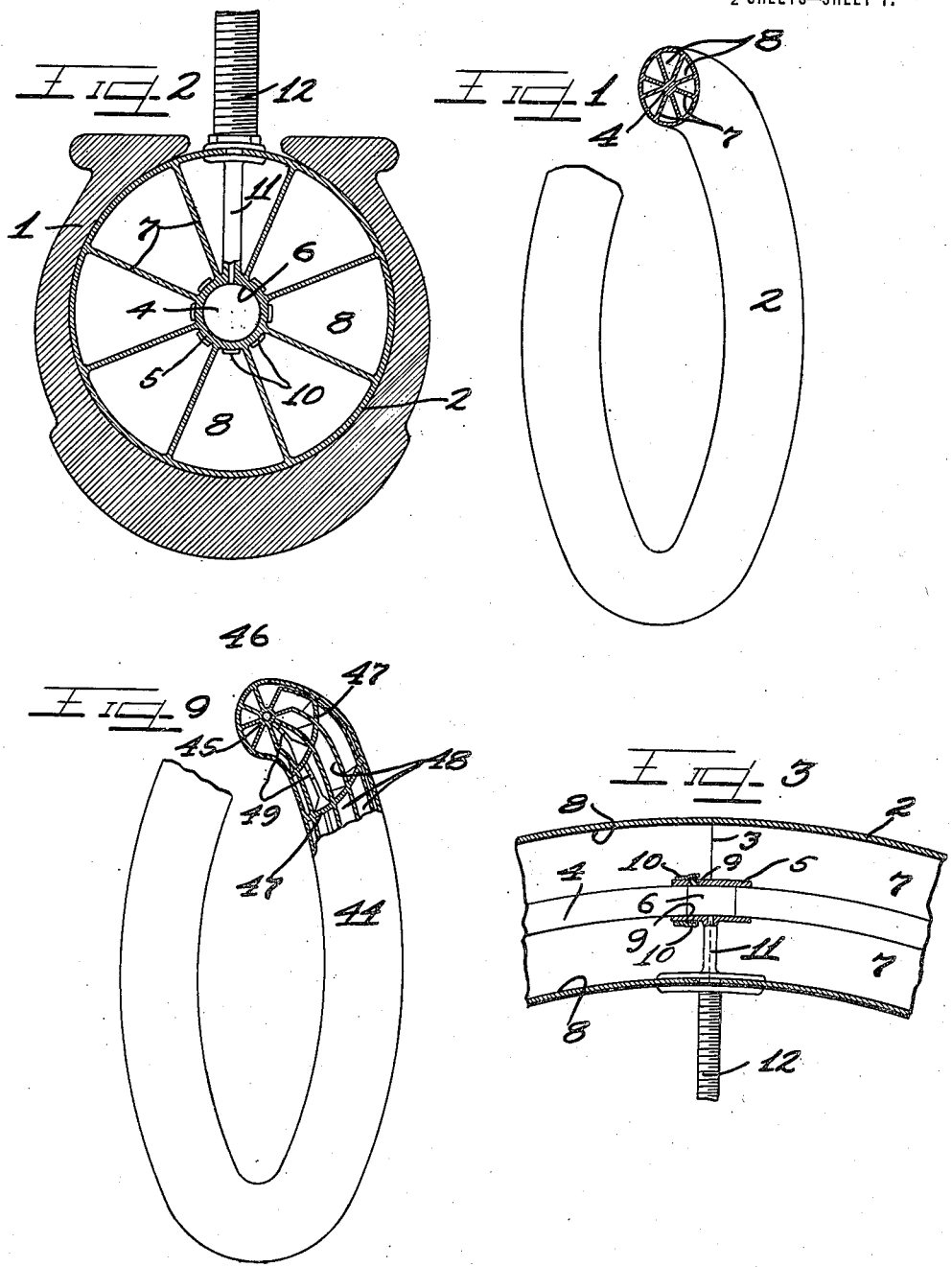

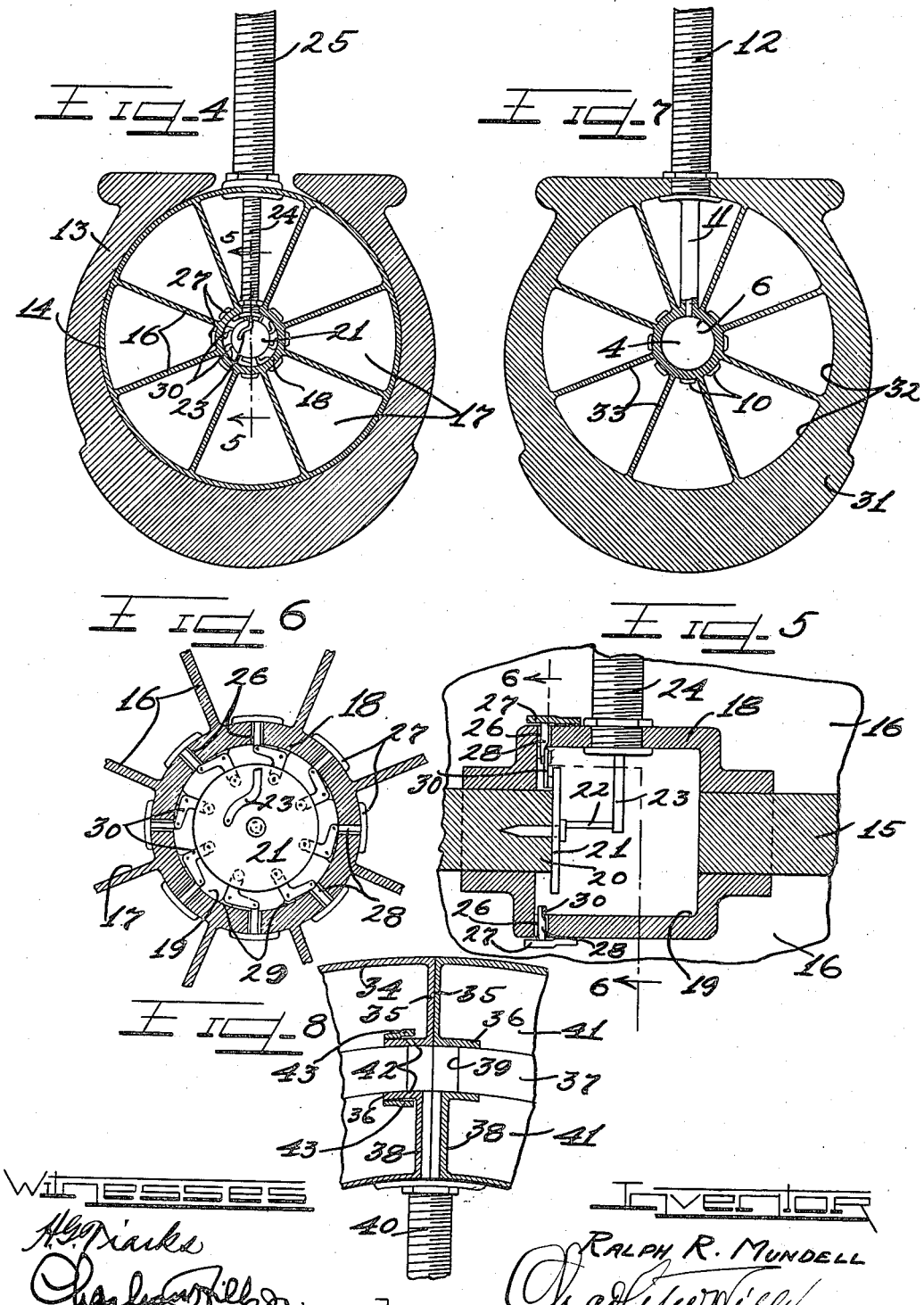

1,438,257

UNITED STATES PATENT OFFICE.

RALPH R. MUNDELL, OF CHICAGO, ILLINOIS.

MULTIPLE-CELL INNER TUBE.

Application filed March 28, 1921. Serial No. 456,249.

*To all whom it may concern:*

Be it known that I, RALPH R. MUNDELL, a citizen of the United States, and a resident of the city of Chicago, in the county of Cook and State of Illinois, have invented certain new and useful Improvements in a Multiple-Cell Inner Tube; and I do hereby declare that the following is a full, clear, and exact description of the same, reference being had to the accompanying drawings, and to the numerals of reference marked thereon, which form a part of this specification.

This invention relates more particularly to an improved type of inner tube wherein the interior is divided into a plurality of independent endless compartments all of which may be inflated simultaneously from a common source of air supply.

It is an object of this invention to provide an inner tube with a plurality of chambers or compartments any one of which may be punctured without putting the tube out of condition for use.

Another object of the invention is to construct a tire or inner tube with a plurality of radial vanes connecting a solid core with the outer casing or tube.

A further object of the invention is to provide an inner tube the interior of which is divided into a plurality of radially disposed independent endless compartments each provided with an air inlet valve, said valves connected to be simultaneously opened by depressing the needle valve rod forming a part of an air valve connected to the tube for inflating all of said compartments at the same time.

It is an important object of this invention to provide an improved pneumatic tire or inner tube of simple and effective construction wherein the interior is divided into a plurality of independent endless chambers all of which are adapted to be inflated from a common source.

Other and further important objects of this invention will be apparent from the disclosures in the specification and drawings.

The invention (in a preferred form) is illustrated in the drawings and hereinafter more fully described.

On the drawings:

Figure 1 is a perspective view of an inner tube embodying the principles of this invention and partly broken away to show a cross-section thereof.

Figure 2 is an enlarged transverse section of the tube disposed within a tire casing.

Figure 3 is a fragmentary longitudinal section of the tube.

Figure 4 is a transverse section of a modified form of inner tube shown within a tire casing.

Figure 5 is an enlarged fragmentary detail section taken on line 5—5 of Figure 4.

Figure 6 is a section taken on line 6—6 of Figure 5.

Figure 7 is a modified form of the device wherein the inner tube is vulcanized in a tire casing.

Figure 8 is a fragmentary longitudinal section through another modified form of inner tube.

Figure 9 is a perspective view of still another modified form of inner tube partly broken away to illustrate the interior construction.

As shown on the drawings:

The reference numeral 1 indicates a tire casing having disposed therein an inner tube comprising an endless rubber tube 2 formed from a length of tubing the ends of which are vulcanized together at 3. Provided axially within the tube 2 is a solid core 4, the ends of which are spaced apart to afford a gap therebetween. The ends of the core 4 are connected by means of a sleeve 5, thereby affording a chamber 6 within the sleeve and between the ends of said core. Integrally connecting the core 4 with the tube 2 are a plurality of radially directed endless partitions or vanes 7, which divide the interior of the tube 2 into a plurality of independent endless chambers 8. The sleeve 5 is provided with a plurality of ports or openings 9, one for each of the chambers 8. Flap valves 10 are secured on the sleeve 5 to close the ports 9. Formed on the sleeve 5 is a rubber air supply tube 11 which communicates with the chamber 6. The air supply tube has the outer end connected with an inner tube valve mounted within a sleeve 12 attached to the inner tube 2 in any suitable manner.

Figures 4, 5 and 6 illustrate a modified form of inner tube engaged in a tire casing 13. The inner tube in this case comprises an endless rubber tube 14 formed from a length of tubing the ends of which are vulcanized together. Axially disposed within the tube 14 is a solid core 15, the ends of which are spaced apart to afford a gap therebetween. Integrally connecting the core 15 with the tube 14 are a plurality of radially directed endless partitions or vanes 16 which divide the interior of the tube 14 into a plurality of independent endless chambers 17. Connecting the ends of the core 15 is a housing or sleeve 18. The sleeve 18 has a chamber 19 into which one end 20 of the core 15 projects a short distance. Secured rotatably on the core end 20 is a disk 21 having a rod 22 secured eccentrically thereon at right angles and projecting into the chamber 19. The rod 22 is connected to the inner end of a stem 23 which projects into the chamber 19 from an air supply tube 24 disposed radially within the inner tube 14 and having the ends thereof secured to the inner tube 14 and to said sleeve 18. Attached to the inner tube 14 is an inner tube valve sleeve 25, from which the stem 23 projects through the tube 24 to be connected to the rod 22. The sleeve 18 is provided with a plurality of air ports or openings 26, one for each of the inner tube chambers 17. Flap valves 27 are secured on the sleeve 18 to close the air ports 26. Attached to the flap valves 27 are stems or pins 28 which project into the sleeve 18 through the air ports 26. Pivotally mounted within the sleeve 18 on lugs 29 are a plurality of bell cranks 30, one for each of the flap valves 27. The bell cranks 30 are pivotally connected to the flap valve stems 28 and to the disk 21, as illustrated in Figure 6.

In the modified form of the device disclosed in Figure 7, a tire casing 31 has vulcanized therein an inner tube to form a unit with said casing. The casing is divided into a plurality of endless chambers 32 by radially disposed partitions or vanes 33 which are integral with the casing and with a solid axial core similar to the arrangement illustrated in Figures 1 to 3. Like parts are designated by the same reference numerals used in Figures 1 to 3 inclusive.

Figure 8 discloses a modified form of an inner tube which embraces a tube 34, each end of which is closed by an end plate 35 having integrally formed axially on the inner surface thereof a sleeve or collar 36. The sleeves 36 engage over the separated ends of a solid core 37 provided axially in the tube 34. Each plate 35 has integrally formed radially thereon a semi-cylindrical sleeve section 38. The ends of the tube 34 are vulcanized together to form a circular inner tube. The semi-cylindrical sleeve sections 38 form a flexible air supply tube the inner end of which communicates with a chamber 39 formed by the sleeves 36 between the ends of the core 37. The outer end of the air supply tube 38—38 communicates with an air valve 40 attached to the inner tube in any suitable manner. The core 37 is integrally connected with the tube 34 by a plurality of partitions or vanes 41 similar to the arrangement disclosed in Figure 1. The vanes 41 divide the interior of the tube into a plurality of independent endless chambers. One of the sleeves 36 is provided with a plurality of air inlet openings or ports 42, one for each of the endless chambers formed by the vanes 41. A flap valve 43 is provided for each of the air ports 42.

Figure 9 illustrates another modified form of the device comprising an outer tube 44 and a concentric inner tube 45. The tubes 44 and 45 are integrally connected by radial partitions or vanes 46. Also provided in the outer tube 44 are a plurality of spaced transverse partitions 47. The vanes 46 and the partitions 47 divide the space between the tubes 44 and 45 into a plurality of cells or compartments 48. The inner tube 45 is provided with a plurality of openings or ports 49, one for each of the cells or compartments 48. An air valve is secured to the tube 44 similar to the arrangement illustrated in Figure 3. Each of the air ports 49 is provided with a flap valve.

The operation is as follows:

Referring to Figures 1, 2 and 3, air is forced through the valve 12 into the chamber 6. The pressure of the air entering the ports 9 causes the valves 10 to open, thereby permitting air to enter the various compartments 8 to inflate the inner tube to make it conform to the inner contour of the casing 1. When the air pressure in the inner tube compartments 8 reaches a desired pressure the supply of air is cut off at the air valve 12. When this is done the flap valves 10 will close by the pressure of the air in the compartments 8. The air remaining in the air supply tube 11 will be at atmospheric pressure. It will be noted that if any one of the compartments 8 should be punctured, the air from that compartment only would escape. The remaining compartments would remain inflated and so permit further use of the tire and its inner tube.

In the arrangement illustrated in Figures 4, 5 and 6, the inner tube chambers 17 are adapted to be inflated by forcing air from the air valve 25 through the air supply tube 24 into the chamber 19. The pressure of the air in the chamber 19 will open the valves 27 to permit the inner tube compartments 17 to be inflated. When the air pressure in the compartments has reached the point desired the supply of air is cut off. The pressure of the air in the compartments 17 will close the valves 27. If at any time it is desired to deflate the inner tube 14, the stem 23 in the air valve sleeve 24 is forced inwardly thereby causing the disk 21 to rotate a slight amount. Partial rotation of the disk 21 causes operation of the bell cranks 30, which act to force the pins 28 outwardly to open the flap valves 27 to permit escape of the air from the compartments 17.

The modified forms of the device illustrated in Figures 7 and 8 are adapted to be inflated in a manner similar to that described for Figures 1 to 3 inclusive.

Figure 9 discloses an arrangement wherein the interior of the outer inner tube 44 is divided into comparatively small compartments 49 by radial vanes 46 and transverse partitions 47. In this case air is forced into the core tube 45 and then into the various compartments 48 through the air ports 49 to inflate the tube 44. The ports 49 are provided with valves which are closed by the air pressure in the compartments. A puncture of any one of the compartments will permit the escape of the air from said compartment only, and the remaining compartments will remain inflated to permit further use of the inner tube.

I am aware that numerous details of construction may be varied through a wide range without departing from the principles of this invention, and I therefore do not purpose limiting the patent granted otherwise than necessitated by the prior art.

I claim as my invention:

1. An inner tube comprising an endless tube, a solid core therein, vanes integrally connecting said core and said endless tube to divide the interior of said endless tube into a plurality of compartments. said core having an opening between the ends thereof, a sleeve engaged on the ends of said core to enclose said opening, said sleeve having a plurality of air ports therein one for each of said compartments, valves on said sleeve to control said air ports, a flexible air supply tube connecting said sleeve with said endless tube, and an air valve connected to said endless tube and with said flexible air supply tube.

2. The combination with an inner tire tube, of means dividing said tube into a plurality of longitudinal endless chambers, an axial sleeve in said tube having air ports therein one for each of said chambers, a valve on said sleeve for each of said ports, a flexible tube connecting said sleeve with said inner tire tube, and an air supply valve connected to said inner tire tube and communicating with said flexible tube.

3. The combination with a tire casing, of an inner tube therein, an air valve connected to said inner tube and projecting from said casing, vanes dividing said inner tube into a plurality of compartments, a sleeve secured in said inner tube having a plurality of air ports therein one for each of said compartments, valves on said sleeve within said compartments for controlling said air ports, and a passaged radial air supply member connecting said air valve with said sleeve.

4. The combination with an inner tube, of a solid core axially disposed therein, said core having the ends thereof separated, a sleeve connecting the ends of said core, vanes in said tube connected to said core and to said sleeve dividing the tube into a plurality of compartments, said sleeve having a plurality of air ports therein one for each of said compartments, valves on said sleeve for controlling said air ports, an air supply valve attached to said tube and connected with said sleeve to supply air to all of said compartments through said air ports, said port valves adapted to be closed by the pressure of the air in said compartments, and means in said sleeve for opening said port valves against the pressure of the air in said compartments.

5. The combination with an inner tube, of members therein dividing the same into a plurality of independent compartments, a sleeve in said tube connected with said members, said sleeve having a plurality of air ports therein one for each of said compartments, a plurality of valves on said sleeve for controlling said air ports, an air supply valve connected to said tube and to said sleeve to supply air to said compartments through said air ports, said air port valves adapted to be closed by the pressure of the air in said compartments, an adjustable member mounted in said sleeve, means connecting said air port valves with said adjustable member, and a mechanism projecting through said air supply valve and connected with said adjustable member to permit actuation of the same to simultaneously open all of said air port valves.

6. The combination with an inner tube, of members therein dividing the same into a plurality of independent compartments, a chambered member in said tube having air ports therein one for each of said compartments, air supply mechanism connected with said tube and with said chambered member for supplying air to said compartments, valves for said air ports adapted to be closed by the pressure of the air in said compartments, and a mechanism in said chambered member connected to all of said air port valves to permit simultaneous opening of the same against the air pressure in said compartments.

7. The combination with an inner tube, of means for dividing the same into a plurality of compartments, air supply means connected to said tube to simultaneously supply air to all of said compartments to inflate the tube, valves in said compartments adapted to be closed by the pressure of the air in said compartments, and means connected to all of said valves adapted to be operated to cause simultaneous opening thereof to release the air in said compartments.

8. In a device of the class described, an inner tube, members dividing the same into a plurality of independent compartments, air supply means connected to said tube for simultaneously supplying air to all of said compartments to inflate the tube, a valve for each of said compartments, said valves adapted to be closed by the pressure of the air in said compartments, a rotatable member in said tube, a plurality of bell cranks connected thereto, members connecting said bell cranks to said valves, and a mechanism connected with said rotatable member for actuating the same to cause simultaneous opening of all of said valves to permit escape of the air from said compartments.

In testimony whereof I have hereunto subscribed my name in the presence of two subscribing witnesses.

RALPH R. MUNDELL.

Witnesses:
 J. B. MUNDELL,
 CARLTON HILL.